May 19, 1931.   J. M. JOLLS   1,805,488
APPARATUS FOR TEACHING MUSIC
Filed Sept. 13, 1928   3 Sheets-Sheet 1

Inventor
John Myron Jolls
By Jas. C. Wobensmith
Attorney

May 19, 1931.  J. M. JOLLS  1,805,488
APPARATUS FOR TEACHING MUSIC
Filed Sept. 13, 1928   3 Sheets-Sheet 2

Inventor:
John Myron Jolls,
By Jas. C. Wobensmith
Attorney.

May 19, 1931.    J. M. JOLLS    1,805,488
APPARATUS FOR TEACHING MUSIC
Filed Sept. 13, 1928    3 Sheets-Sheet 3

Inventor:
John Myron Jolls,
By Jas. C. Wobensmith
Attorney

Patented May 19, 1931

1,805,488

UNITED STATES PATENT OFFICE

JOHN MYRON JOLLS, OF PHILADELPHIA, PENNSYLVANIA

APPARATUS FOR TEACHING MUSIC

Application filed September 13, 1928. Serial No. 305,633.

My invention relates to apparatus for teaching music, which is particularly adaptable for quickly and efficiently teaching the reading of music to individuals as well as to groups or classes of students.

My present invention contemplates the provision of several devices adapted to be used in certain relationships with each other, whereby the location on the staff of various tones of a key, as indicated by the key signature, and also the names of the lines and spaces of the staff, in relation to the clef signature, may be impressed upon the minds of the students, for the purpose of enabling them to read music.

The object of my present invention, therefore, is to provide improved apparatus for teaching music, which will be particularly adaptable for use in teaching the reading of music, whereby knowledge of the same may be more readily and expeditiously acquired.

The nature and characteristic features of my invention will be more readily understood from the following description, taken in connection with the accompanying drawings forming part hereof, in which:

Figures 1, 2, and 3 are perspective views of portions of the apparatus of my invention, each comprising a flat, rectangular chart having typically designated thereon a music staff, a clef signature, notes at desired places on the staff, and sharps or flats, as the case may be, at certain other places on said staff;

Figure 4:
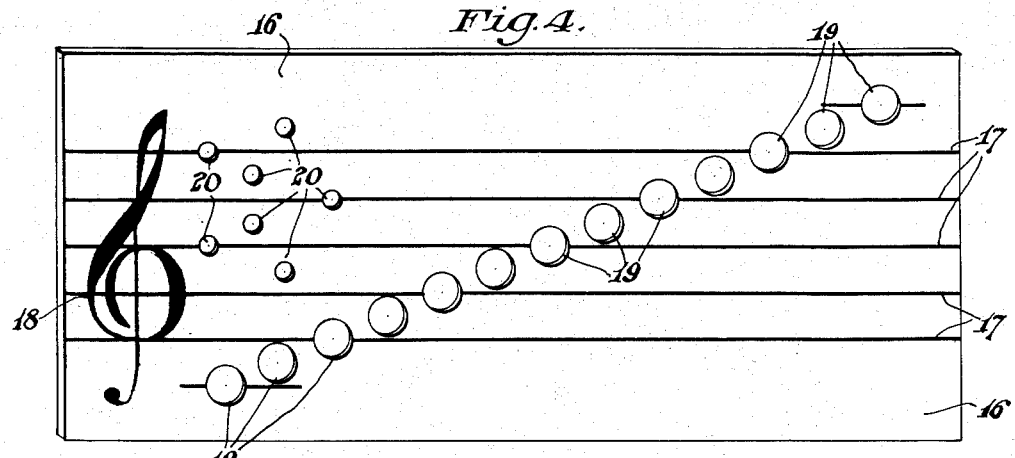
Fig. 4 is a perspective view of another portion of the apparatus of my invention, comprising a board having designated thereon a music staff and a clef signature, and being provided with two groups of perforations, for use in conjunction with certain other portions of the apparatus of my invention.
Figures 5, 6:
Fig. 5 is a perspective view of a member, illustrating one face thereof, having a character representing a flat designated thereon, and a circular projection or teat extending therefrom, said member being adapted to be used in conjunction with one group of perforations in the board shown in Fig. 4.
Fig. 6 is a view similar to Fig. 5, illustrating the other face of said member, having a character representing a sharp designated thereon, and also having a circular projection or teat extending therefrom.
Figure 8:
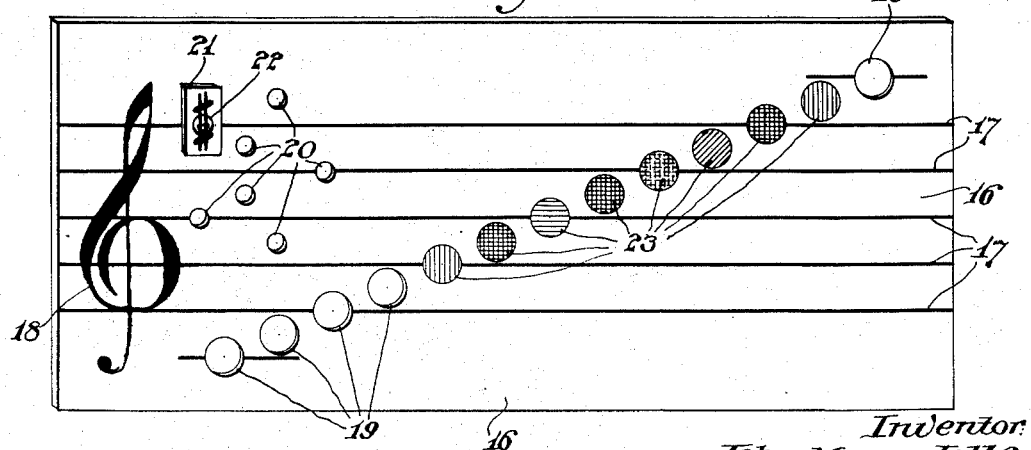
Fig. 8 is a perspective view of the board illustrated in Fig. 4, showing the use of the same in conjunction with one of the members illustrated in Figs. 5 and 6, and the disks illustrated in Fig. 7.
Figure 9:
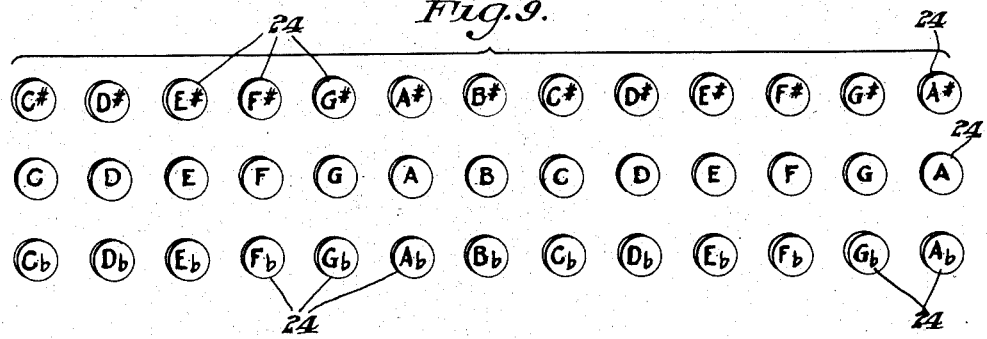
Figure 10:
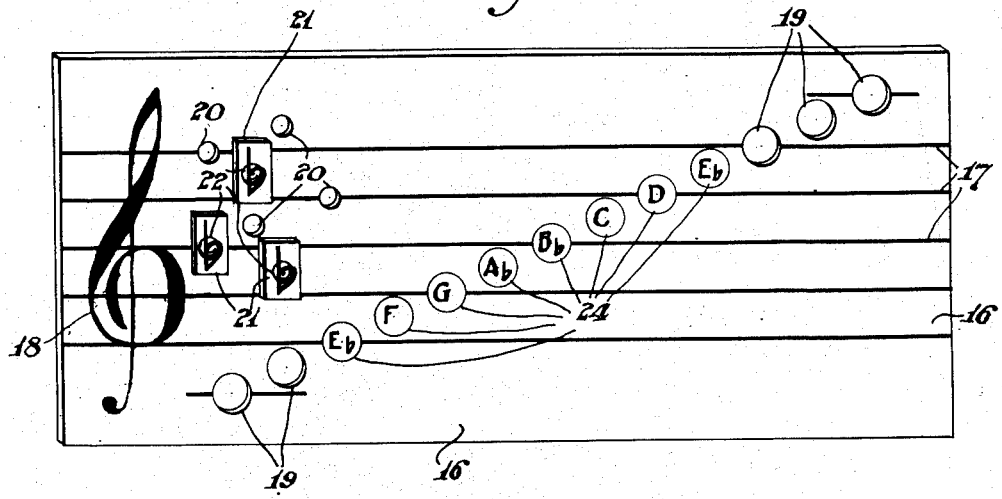

Fig. 9 is a perspective view of another group of disks, each having a pitch name designated thereon, adapted to be used in a manner similar to that of the disks illustrated in Fig. 8; and Fig. 10 is a perspective view of the board illustrated in Fig. 4, showing the use of the same in conjunction with certain of the members illustrated in Figs. 5 and 6, and certain of the disks illustrated in Fig. 9.

Figure 1:
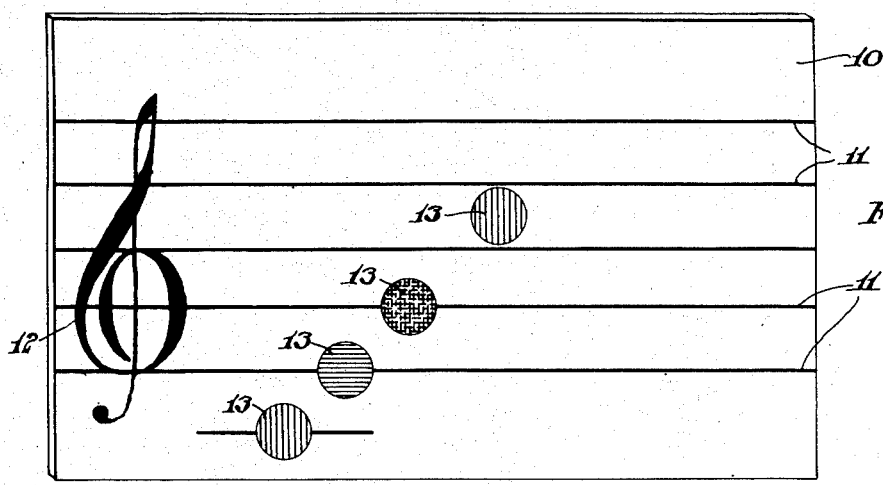
Figure 2:
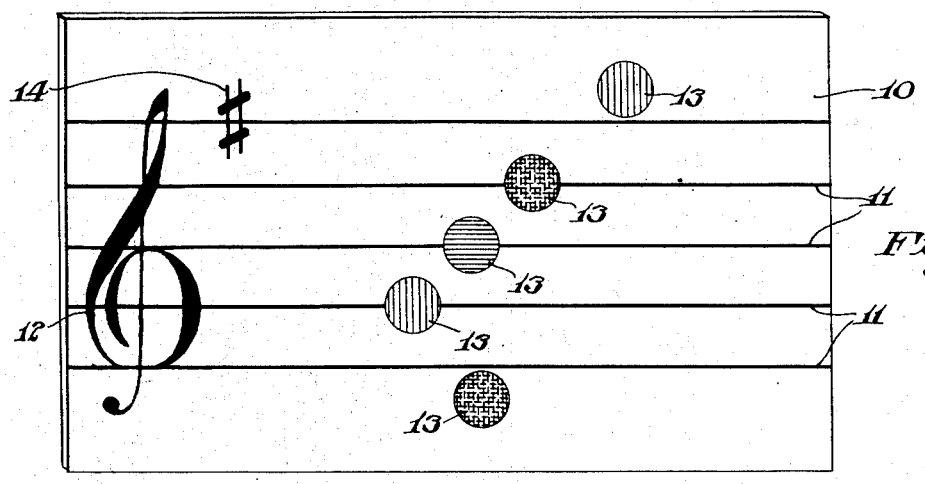
Figure 3:
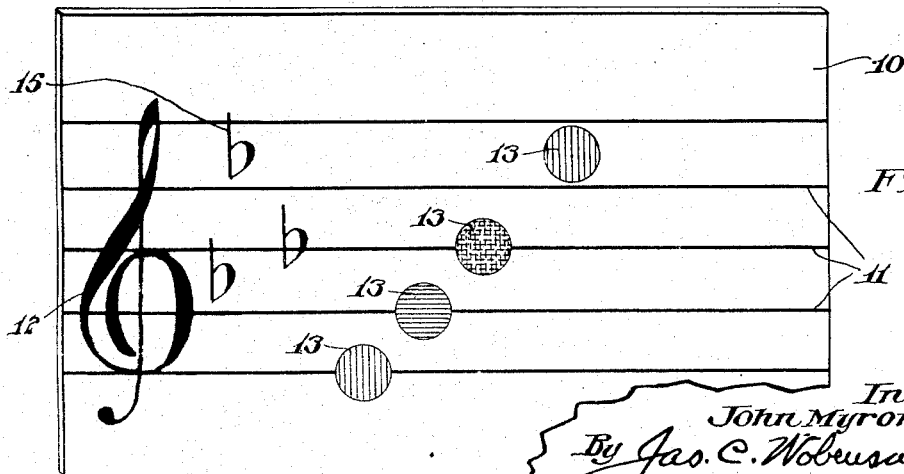

Referring to the drawings, in Figs. 1 to 3 there are shown forms or embodiments of portions of the apparatus of my invention, comprising charts 10, preferably made of press board or the like. Printed or otherwise designated on each board 10 are a music staff 11, and a character representing a "G" clef signature 12. One chart 10 is provided for each key signature which it is desired to illustrate.

Arranged on the lines and spaces of the staff 11, shown on each board 10, are vari-colored circles 13 representing notes. These circles 13 are arbitrarily colored, a certain color being adopted to indicate each of the syllable names of the notes which they represent, for a purpose to be hereinafter explained. In the drawings, the tonic or "do" of each scale is colored red; the mediant or "mi" is colored blue; and the dominant or "sol" is colored yellow. Of course, any other color arrangement may be employed; or, if desired, the notes may be of the same color, and each marked with its syllable name.

The staff 11 shown in Fig. 1 of the drawings contains neither sharps nor flats in the key signature, so that it is said to be in the key of "C". Therefore, at each place where the note "C" appears on the staff, it is colored red, to indicate the tonic of the key of "C". The other notes are also colored in accordance with the arrangement hereinbefore described for identifying the various tones of a key.

In Fig. 2 of the drawings, at the proper place for the key signature, the staff 11 is shown provided with a character 14 representing a sharp, indicating that the arrangement of notes placed on said staff contains one sharp, and is therefore in the key of "G". In this instance, the note "G" on the staff is colored red, to indicate the tonic, and the other notes are colored in accordance with the arrangement hereinbefore described for indentifying the same according to their syllable names.

In Fig. 3 of the drawings, the staff 11 is shown provided with three characters 15 representing flats, indicating that the arrangement of notes placed on said staff contains three flats, and is therefore in the key of "E-flat". In this case also the notes are colored in accordance with the colors adopted to designate their syllable names.

Referring now to Fig. 4 of the drawings, the board 16 there shown has designated thereon a staff 17, and the "G" clef signature 18.

This board 16 is provided with perforations 19, preferably circular in shape, one on each of the lines of the staff 17, one in each of the spaces between said lines, one on each of the leger lines immediately above and below said staff 17, and one in each of the leger spaces between said leger lines and said staff 17. The purpose of these perforations will be hereinafter explained.

The board 16 is also provided with perforations 20, smaller than the perforations 19, adjacent the clef signature 18. The purpose of these perforations 20 will also be hereinafter explained.

Referring to Figs. 5 and 6 of the drawings, there are there shown two faces of a member 21. The face of said member shown in Fig. 5 has imprinted thereon a character representing a flat, and the face shown in Fig. 6 has imprinted thereon a character representing a sharp, and each face of said member 21 is provided with a circular projection or teat 22, which is adapted to be positioned in one of the perforations 20 in the board 16, for the purpose of locating the member 21 at the proper place to indicate a key signature.

A plurality of the members 21 are provided for each board 16, so that any key signature may be indicated as desired.

Figure 7:
Fig. 7 is a perspective view of a group of disks, each distinctively colored, for use in conjunction with the other group of perforations shown in Fig. 4.

In Fig. 7 of the drawings, there is illustrated a group of disks 23, each distinctively colored, for a purpose to be hereinafter more fully explained. These disks 23 are adapted to be placed in the perforations 19 in the board 16 (see Fig. 8) for the purpose of indicating musical notes on the staff 17. A plurality of the disks 23 of each color are provided.

As shown in the drawings, certain disks are colored red, others blue, others yellow, others brown, and others black. For the purpose of carrying out the method of my invention, the color red has been arbitrarily selected to indicate the tonic of a key; blue to indicate the mediant; yellow to indicate the dominant; brown to indicate the sub-mediant or minor tonic; and black to indicate all of the other tones. This color scheme is similar to the one hereinbefore described for coloring the notes 13 on the charts 10.

Of course, it will be understood that any desired color arrangement may be employed, or the syllable names of the notes represented by the disks may be visually indicated thereon in any preferred manner.

In Fig. 9 of the drawings, there is illustrated another group of disks 24, having pitch names designated thereon. The disks 24 are adapted to be used in a manner similar to that of the disks 23.

As shown in Fig. 9, there are three disks 24 provided for each perforation 19 in the board 16, one disk being marked with the natural pitch name, another with the sharped pitch name, and another with the flatted pitch name. The disk marked with the sharped or flatted pitch name is adapted to be used in place of the one with the natural pitch name, when the key signature requires that that pitch be sharped or flatted, as the case may be.

The use of my invention may now be explained. The charts 10 are preferably retained by the teacher, and the board 16, the members 21, and the two groups of disks 23 and 24, are placed in the hands of the student.

The teacher exhibits one of the charts 10, explaining the meaning of the vari-colored notes imprinted thereon, that is, that the color red indicates "do", the color blue "mi", and the color yellow "sol". As shown, the charts 10 are provided with notes in three colors, while the disks 23 are provided in five colors. The teacher may explain that the color brown indicates "la", or the minor tonic, and black all of the other tones.

If the chart 10 which the teacher shows contains neither sharps nor flats in the key signature, the student will notice that the notes in the third space of the staff, and on the leger line immediately below the staff, are colored red, and will therefore know that "do" appears at those places on the staff. He will also notice the location of "mi" and "sol" on the staff, and from these can readily determine the location of the other tones.

The student may now place the colored disks 23 in the perforations 19 of the board 16, following the chart 10, which is exhibited as a guide, for the location of the various colors (see Fig. 8). He preferably forms a scale in whatever key is called for by the key signature on the chart which is displayed. The three colors which are shown on the charts 10 are a sufficient guide for the colors which will be shown in an entire scale.

If the chart 10 which is displayed contains one or more sharps, the student, after carefully noting the number of the same and their location on the staff, places one or more of the members 21 in the proper perforations 20, the face of each of said members displaying a sharp being uppermost, and the teat 22 on the reverse face being positioned in one of the perforations 20. He then places the colored disks 23 in the perforations 19 of the board 16, still using the chart 10 as a guide for the location of the same.

The same method is followed when the chart 10 contains one or more flats, except that in that case the members 21 are reversed, and the faces of said members displaying flats are shown.

The charts may then be removed from view, and the student required to form various scales without the use of the same.

The student may then be informed that there are seven pitch names in a musical scale, and that they are the first seven letters of the alphabet. He may then be told how these pitches are represented on the staff. For example, on a staff having the "G" clef signature, the first or lowest line of the staff represents a certain pitch of "E"; the first space a certain pitch of "F", etc. Thus, by counting, he will be able to determine the name of any note written on the staff.

The student may then place the various disks 24, containing pitch names, in the perforations 19 of the board 16, which impresses upon him the names of the notes which may be written on the staff.

As hereinbefore mentioned, there are three disks 24 provided for each perforation 19. If there are no sharps or flats in the key signature, that is, if none of the members 21 is placed in the perforations 20 of the board 16, all of the disks 24 which are placed in the perforations 19 will bear the natural pitch names. However, if one or more of the members 21 are placed in the perforations 20, the student will substitute for certain of the disks 24 bearing natural pitch names, disks bearing either the sharped or flatted pitch names, as the case may be. For example, if one member 21 is placed in the proper perforation 20, the face of said member on which a sharp is designated being uppermost, the disk mark "F♯" will be substituted for the disk mark "F", every time that note appears on the staff (see Fig. 10).

As shown in the drawings, the charts 10 and the board 16 have designated thereon the "G" clef signature. It will, of course, be understood that my invention is applicable to the teaching of music reading in any clef desired, although in other clefs the notation of the staff will differ from that in the "G" clef, which may be explained before requiring the student to use the various disks.

It will be seen that there is thus provided apparatus for teaching music, which will be found to be useful not only for teaching individuals, but also for instructing groups or classes of students in music reading, which will be more efficient than any method of teaching at present in use, and which will indelibly impress upon the minds of the students, by visualization, the location of pitches on a staff.

Having thus described the nature and characteristic features of my invention, what I claim as new and desire to secure by Letters Patent, is:

1. In apparatus for teaching music, the combination of and a plurality of charts each having designated thereon a staff, a clef signature, a particular key signature, and a plurality of notes at certain places on said staff, said notes bearing indicia of their syllable names; a plurality of boards each having a staff designated thereon; removable means for indicating sharps and flats on said boards; and a plurality of note indicating members adapted to be mounted on said boards at desired locations as indicated by said charts, certain of said note indicating members bearing indicia similar to those on the notes on said charts.

2. In apparatus for teaching music, the combination of a plurality of charts each having designated thereon a staff, a clef signature, a particular key signature, and a plurality of notes at certain places on said staff, each of said notes being distinctively colored in accordance with an arbitrary plan for identifying its syllable name; and a plurality of boards each having a staff designated thereon; a plurality of members having designated thereon characters indicating sharps and flats, means for positioning said sharp and flat indicating members on said boards; and a plurality of note indicating members adapted to be mounted on said boards, certain of said note indicating members being distinctively colored similarly to the notes on the charts.

3. In apparatus for teaching music, the combination of a plurality of charts each having designated thereon a staff, a clef signature, a particular key signature, and a plurality of notes at certain places on each staff, each of said notes being distinctively colored in accordance with an arbitrary plan for identifying its syllable name; and a plurality of boards each having a staff designated thereon; a plurality of members having designated thereon characters indicating sharps and flats, means for positioning said sharp and flat indicating members on said boards; and a plurality of note indicating members adapted to be mounted on said boards, certain of said note indicating members being distinctively colored similarly to the notes on the charts, and others of said note indicating members having pitch names designated thereon, the members bearing pitch names being adapted to be used in place of the colored members.

4. In apparatus for teaching music, the combination of a plurality of charts each having designated thereon a staff, a clef signature, a particular key signature, and a plurality of notes at certain places on said staff, said notes bearing indicia of their syllable names; and a plurality of boards each having a staff designated thereon and two groups of perforations formed therein; a plurality of members having designated thereon characters indicating sharps and flats, and being provided with teats for insertion in the perforations of one group in the perforated boards; and a plurality of note indicating disks adapted to be inserted in the perforations in the other group in the perforated boards as indicated by the charts.

5. In apparatus for teaching music, the combination of a plurality of charts each having designated thereon a staff, a clef signature, a particular key signature, and a plurality of notes at certain places on said staff, each of said notes being distinctively colored in accordance with an arbitrary plan for identifying its syllable name; and a plurality of boards each having a staff designated thereon and two groups of perforations formed therein; a plurality of members having designated thereon characters indicating sharps and flats, and being provided with teats for insertion in the perforations of one group in the perforated boards; and a plurality of note indicating disks adapted to be inserted in the perforations in the other group in the perforated boards, certain of said disks being distinctively colored similarly to the notes on the charts.

6. In apparatus for teaching music, the combination of a plurality of charts each having designated thereon a staff, a clef signature, a particular key signature, and a plurality of notes at certain places on said staff, each of said notes being distinctively colored in accordance with an arbitrary plan for identifying its syllable name; and a plurality of boards each having a staff designated thereon and two groups of perforations formed therein; a plurality of members having designated thereon characters indicating sharps and flats, and being provided with teats for insertion in the perforations of one group in the perforated boards; and a plurality of note indicating disks adapted to be inserted in the perforations in the other group in the perforated boards, certain of said disks being distinctively colored similarly to the notes on the charts, and others of said disks having pitch names designated thereon, the disks bearing pitch names being adapted to be used in place of the colored disks.

In testimony whereof, I have hereunto signed my name.

JOHN MYRON JOLLS.